United States Patent
Lin

(10) Patent No.: US 8,407,411 B2
(45) Date of Patent: Mar. 26, 2013

(54) OPERATION FREQUENCY ADJUSTING SYSTEM AND METHOD

(75) Inventor: Chuan Lin, Beijing (CN)

(73) Assignee: Wuxi Vimicro Corporation, Jiangsu (CN)

( * ) Notice: Subject to any disclaimer, the term of this patent is extended or adjusted under 35 U.S.C. 154(b) by 8 days.

(21) Appl. No.: 12/824,230

(22) Filed: Jun. 28, 2010

(65) Prior Publication Data

US 2011/0320702 A1    Dec. 29, 2011

(51) Int. Cl.
*G06F 12/00* (2006.01)
*G06F 13/00* (2006.01)
*G06F 13/28* (2006.01)

(52) U.S. Cl. ........................ 711/105; 711/167

(58) Field of Classification Search .......... 711/104–106, 711/167
See application file for complete search history.

(56) References Cited

U.S. PATENT DOCUMENTS

| | | | | |
|---|---|---|---|---|
| 5,754,838 A * | 5/1998 | Shibata et al. | ................ | 713/600 |
| 7,523,282 B1 * | 4/2009 | Kapil et al. | ................... | 711/167 |
| 7,627,730 B1 * | 12/2009 | Moll | ............................. | 711/170 |
| 2003/0056057 A1 * | 3/2003 | Lawrence | ..................... | 711/106 |
| 2003/0214339 A1 * | 11/2003 | Miyamoto | .................... | 327/276 |
| 2006/0028883 A1 * | 2/2006 | Shimoyama | .................. | 365/200 |
| 2006/0050602 A1 * | 3/2006 | Lin et al. | ....................... | 365/233 |
| 2007/0253271 A1 * | 11/2007 | Ito et al. | ........................ | 365/222 |
| 2009/0248976 A1 * | 10/2009 | Rotithor | ....................... | 711/113 |
| 2010/0005214 A1 * | 1/2010 | Trombley et al. | ............. | 710/310 |
| 2010/0031075 A1 * | 2/2010 | Kapil | ............................. | 713/340 |
| 2011/0158030 A1 * | 6/2011 | Bae et al. | .................. | 365/233.1 |

* cited by examiner

*Primary Examiner* — Kevin Ellis
*Assistant Examiner* — Ryan Bertram
(74) *Attorney, Agent, or Firm* — Wuzi Sino IP Agency, Ltd.; Joe Zheng

(57) ABSTRACT

Techniques pertaining to adjusting the operation frequency of a DRAM are disclosed. According to one embodiment, the DRAM operation frequency adjusting system includes a statistic module counting effective operations of a DRAM to obtain a bandwidth utilization rate of the DRAM at a present operation frequency; a parameter configuration module including a target frequency configuration sub-module configured to generate a target operation frequency; and a frequency switch controller for switching a present operation frequency of the DRAM to the target operation frequency. The invention adjusts the operation frequency of a DRAM according to the application environment, and creates a balance between performance and power consumption of DRAMs, and thus improves operation speed of system-on-chips as well as decreases the power consumption.

22 Claims, 5 Drawing Sheets

OPERATION FREQUENCY ADJUSTING SYSTEM AND METHOD

BACKGROUND OF THE INVENTION

1. Field of the Invention

The present invention generally relates to the area of Dynamic Random-Access Memory (DRAM) technology, more particularly to an operation frequency adjusting system for DRAM and a method thereof.

2. Description of Related Art

DRAM is a dynamic random access memory, which retains data for only a short period of time. In order to extend data retention time, DRAM adopts a memory capacitor and refreshes the retained data at specific time intervals. The periodic data refreshment is operated and controlled by a DRAM controller. The operation consumes a large amount of electric energy. Therefore, DRAM usually requires a large capacity battery.

As a typical system-on-chip (SOC), a multimedia system-on-chip includes a plurality of functional modules, such as processor, hardware accelerator, and so on. The functional modules operate independently and may need to access to various memory devices. Because some of the functional modules in the multimedia system-on-chip usually store their data on an external DRAM during data processing to reduce the system cost. For a more complicated multimedia system-on-chips, depending on their tasks, the bandwidth requirements of the DRAM may be significantly different. For example, during the process of displaying high-definition streaming media files, the multimedia system-on-chip requires the processor and the hardware accelerator to run at full speed. The operation frequency of the DRAM in this case is typically high (e.g., at least 166 MHz). On the other hand, during the process of displaying MP3 media, the required bandwidth for DRAM operation decreases dramatically (e.g., to 50 MHz). Thus, the power consumption of the multimedia system-on-chip depends on the tasks being performed.

The conventional multimedia system-on-chips ignore the operation frequency characteristics and pre-configure the operation frequency of DRAM only at some specific stages, (for example, at the start time of the system). Therefore, it is difficult to achieve an optimal balance between an efficient operation and the power consumption of a DRAM.

Thus, there is an urgent need for a technology to provide a method for adjusting the operation frequency of DRAM such that an optimal balance between the efficiency and power consumption of DRAM can be obtained, and to enable the system-on-chip to operate at a desired speed and simultaneously achieves improvements in the power consumption.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques for adjusting operation frequency of DRAM to achieve an optimal balance between efficiency and power consumption of DRAM. According to one aspect of the invention, the DRAM operation frequency adjusting system includes a statistic module counting effective operations of a DRAM to obtain a bandwidth utilization rate of DRAM at a present operation frequency. If the utilization rate is not suitable for the present application environment, a parameter configuration module including a target frequency configuration sub-module configured generates a target operation frequency, and a frequency switch controller switches the present operation frequency of DRAM to the target operation frequency. The invention adjusts the operation frequency and creates a balance between the performance and the power consumption of DRAMs, and thus improves the operation speed of system-on-chips as well as decreases the power consumption.

According to one embodiment, the present invention is a DRAM operation frequency adjusting system comprising: a statistic module counting effective operations of a DRAM; a parameter configuration module generating a target operation frequency according to a count of the effective operations of the DRAM; and a frequency switch controller switching from a present operation frequency of DRAM to the target operation frequency.

According to another embodiment, the present invention is a DRAM operation frequency adjusting method comprising: counting effective operations of a DRAM during a predetermined time interval to obtain a bandwidth utilization rate of the DRAM at a present operation frequency; generating a target operation frequency when the bandwidth utilization rate of DRAM is not suitable for a current application environment; and switching the present operation frequency of DRAM to the target operation frequency.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art.

Numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 1:
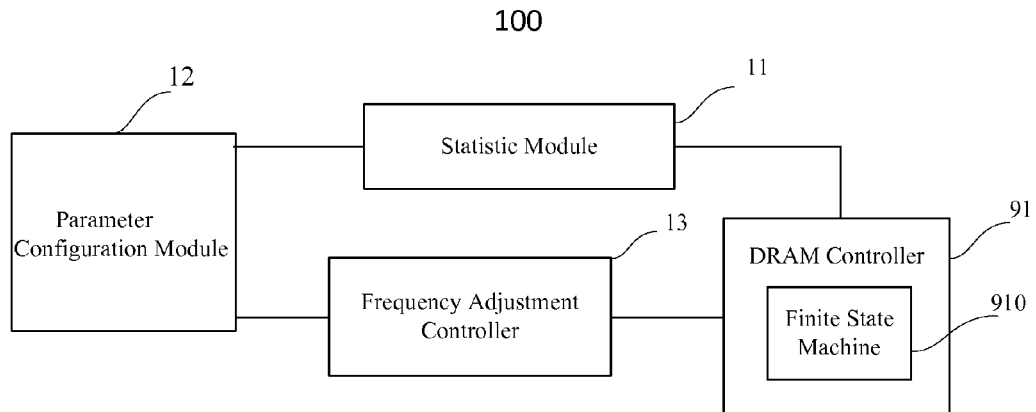
FIG. 1 is a schematic block diagram showing an example of a DRAM operation frequency adjusting system.

Referring now to the drawings, in which like numerals refer to like parts throughout the several views. Referring to FIG. 1, a schematic block diagram of a DRAM operation frequency adjusting system 100 is shown according to one embodiment of the present invention. The operation frequency adjusting system 100 includes a statistic module 11, a parameter configuration module 12, and a frequency switch controller 13.

The statistic module 11 counts the effective operations of DRAM and obtains a corresponding bandwidth utilization rate (i.e., a bandwidth utilization rate of DRAM at the present operation frequency). The parameter configuration module 12 generates a target operation frequency adapted to a present application environment according to the count of the effective operations of DRAM. The frequency switch controller 13 switches the present operation frequency of DRAM to the target operation frequency.

Figure 2:
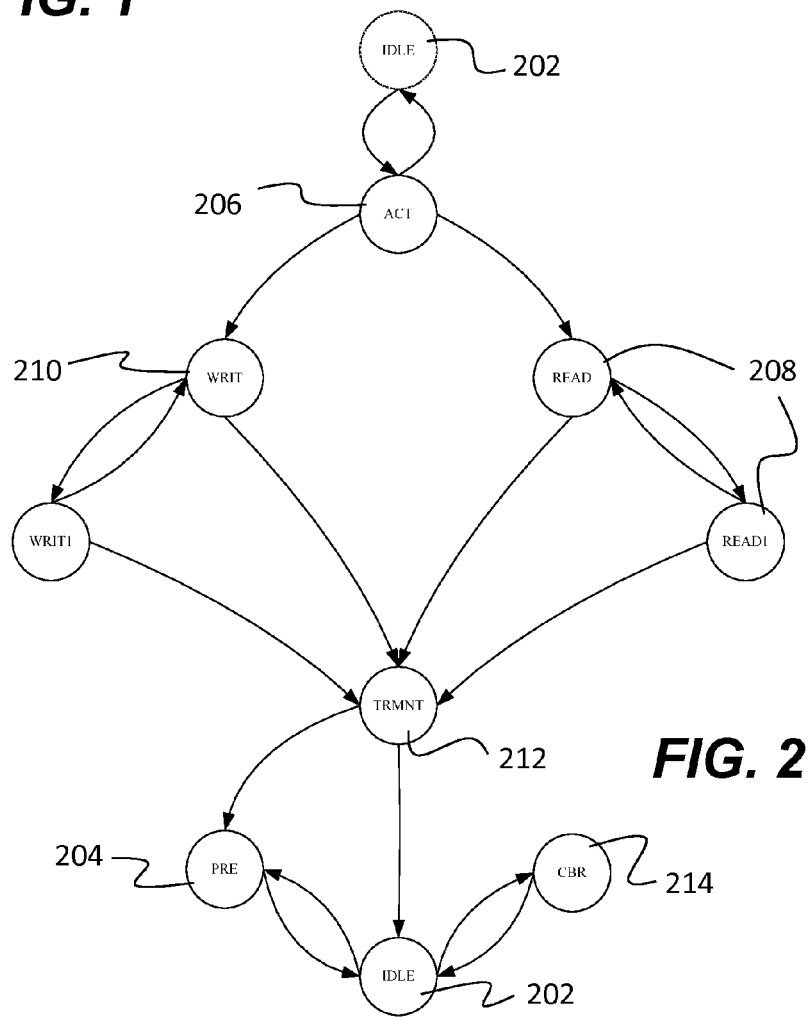
FIG. 2 shows exemplary operations of a DRAM.

According to one embodiment, the statistic module 11 counts various effective operations of DRAM in a predetermined time interval, and based on which, calculates the bandwidth utilization rate of DRAM. The operation statuses of DRAM are determined by data access commands. The data access commands are generated by a finite state machine 910 in a DRAM controller 91. Referring to FIG. 2, the operation statuses of the finite state machine 910 generally include idle (IDLE) 202, pre-charge (PRE) 204, acting (ACT) 206, reading (READ) 208, writing (WRIT) 210, and so on. Thus, the count of the effective operations of DRAM can be obtained by counting the non-idle operations of the finite state machine 910. The statistic module 11 obtains a real-time bandwidth utilization rate of DRAM by counting the non-idle operations of the finite state machine 910 in a predetermined time interval and decides whether the operation frequency of DRAM needs to be adjusted.

The predetermined time interval is determined according to the present application environment of DRAM. When the bandwidth utilization rate of DRAM at the present frequency is not suitable for the present application environment, the statistic module 11 informs the parameter configuration module 12 (e.g., by means of interruption) to generate the target operation frequency befitting the present application environment according to a desired bandwidth utilization rate of DRAM. The frequency switch controller 13 adjusts the operation frequency of DRAM from the present operation frequency to the target operation frequency. Thus, a better balance between the operating efficiency and the power consumption of DRAM is achieved.

Figure 3:
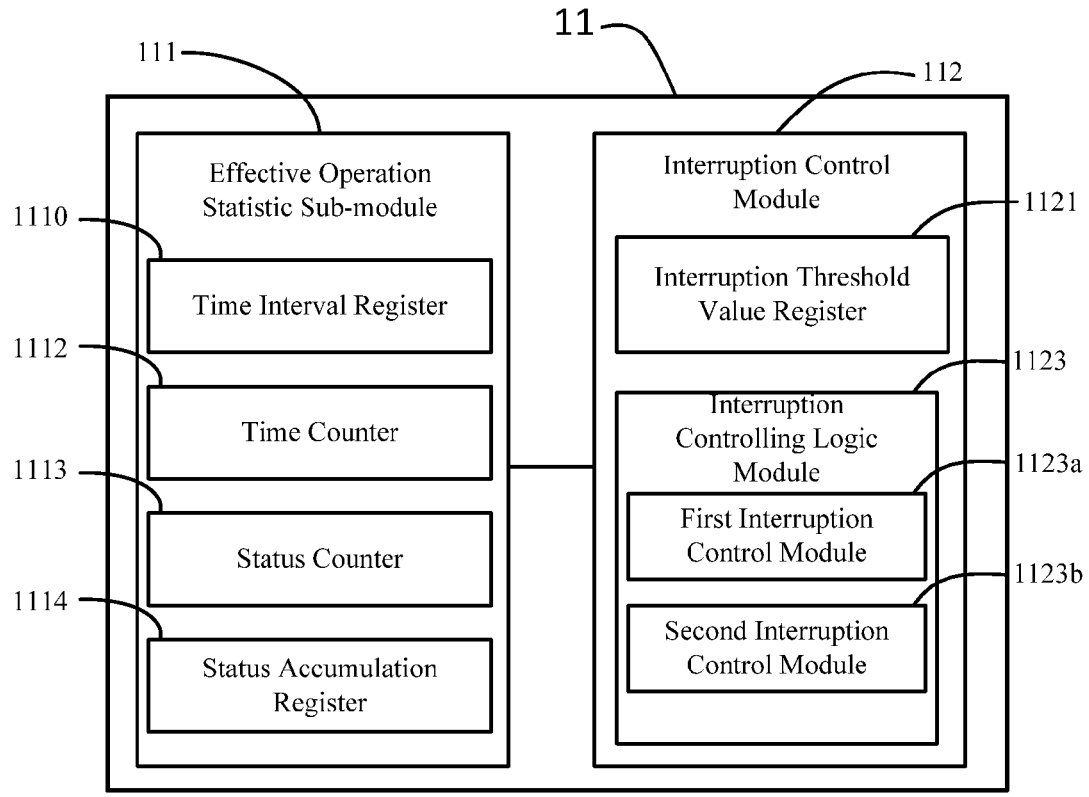
FIG. 3 is a schematic functional diagram showing an example of a statistic module.

Referring to FIG. 3, according to one embodiment, the statistic module 11 includes an effective operation status statistic sub-module 111 and an interruption control module 112. The effective operation status statistic sub-module 111 counts the non-idle operations of the finite state machine 910 during the predetermined time interval and based on which, obtains the operation status of DRAM. The status of the non-idle operation of the finite state machine 910 include pre-charge (PRE), acting (ACT), reading (READ), writing (WRIT), etc., which corresponds to various data access commands of DRAM.

The interruption control module 112 generates an interruption signal for adjusting the operation frequency of DRAM according to the bandwidth utilization rate of DRAM at the present operation frequency. The interruption signal includes a first interruption signal and a second interruption signal. The interruption control module 112 generates the first interruption signal when the present bandwidth utilization rate of DRAM is lower than a desired bandwidth utilization rate at the end of the predetermined time interval, and the operation frequency of DRAM needs to be decreased. The interruption control module 112 generates the second interruption signal when the status count of the non-idle operation of the finite state machine in the predetermined time interval exceeds a predetermined interruption threshold value, and the operation frequency of DRAM needs to be increased.

The effective operation status statistic sub-module 111 includes a time interval register 1110, a time counter 1112, a status counter 1113, and a status accumulation register 1114. The time interval register 1110 sets the predetermined time interval. The time counter 1112 measures time during the predetermined time interval and resets the counter at the end of the predetermined time interval.

The status counter 1113 counts the non-idle operations of the finite state machine 910 in real time during the predetermined time interval, and copies the status count to the status accumulation register 1114. The status counter 1113 is cleared when the predetermined time interval set in the time interval register 1110 is reached. The status count in the status counter 1113 varies with time in the predetermined time interval. At the end of the predetermined time interval, the status count in the status counter 1113 is the status count of all non-idle operations of the finite state machine 910 during the predetermined time interval.

The status accumulation register 1114 saves the status count from the status counter 1113 when the time count result of the time counter 1112 is equal to the predetermined time interval set in the time interval register 1110. The bandwidth utilization rate of DRAM in the predetermined time interval is determined from the status count saved in the status accumulation register 1114.

The interruption control module 112 includes an interruption threshold value register 1121 and an interruption controlling logic module 1123. The interruption threshold value register 1121 sets a threshold value of the bandwidth utilization rate. The interruption controlling logic module 1123 sends out an interruption signal according to the status count of the status counter 1113 in the predetermined time interval and the threshold value, or according to the status count saved in the status accumulation register 1114.

The interruption controlling logic module 1123 includes a first interruption control module 1123a and a second interruption control module 1123b. Based on the status count in the status accumulation register 1114 at the end of the predetermined time interval, the first interruption control module 1123a determines whether the bandwidth utilization rate of DRAM at the present operation frequency is lower than a desired value, and generates a first interruption signal indicating that decreasing the operation frequency of DRAM is desired. Based on the status count in the status counter 1113 and the threshold value, the second interruption control module 1123b determines whether the bandwidth utilization rate of DRAM at the present operation frequency is higher than the threshold value, and generates a second interruption signal indicating that increasing the operation frequency of DRAM is desired.

Figure 4:
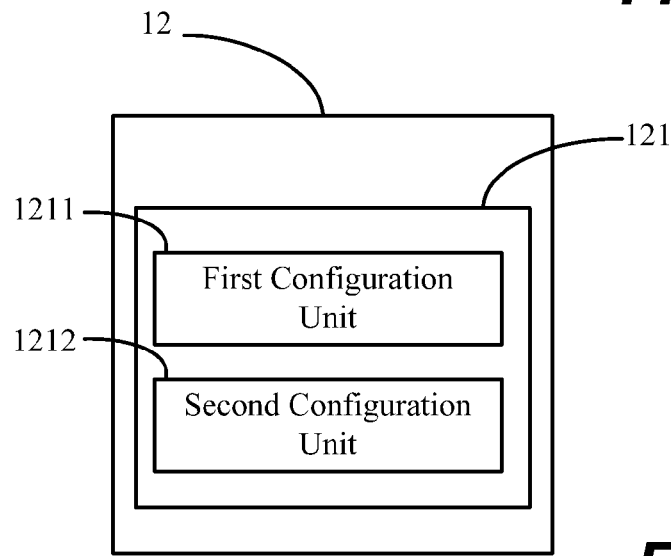
FIG. 4 is a schematic diagram showing an example of a parameter configuration module.

Referring to FIG. 4, the parameter configuration module 12 includes a target frequency configuration sub-module 121. The target frequency configuration sub-module 121 includes a first configuration unit 1211, which generates a target operation frequency lower than the present operation frequency of DRAM according to the first interruption signal, and a second configuration unit 1212, which generates a target operation frequency higher than the present operation frequency of DRAM according to the second interruption signal.

According to one embodiment of the present invention, the generation of the interruption signal includes two possible scenarios. First, at the end of the predetermined time interval, the bandwidth utilization rate of DRAM determined by the status count in the status accumulation register 1114 being lower than the desired value in the actual application, the interruption controlling logic module 1123 sends out the first interruption signal, which indicates that the present operation frequency of DRAM is too high. Second, the interruption controlling logic module 1123 determines the bandwidth utilization rate of DRAM in real-time according to the status count of the status counter 1113 in the predetermined time interval, and sends out the second interruption signal, which indicates that the present operation frequency of DRAM is too low, when the real-time bandwidth utilization rate of DRAM exceeds the threshold value.

FIG. 2 shows various exemplary operations of a DRAM. All those operations except IDLE can be considered as the effective operations, i.e., the non-idle operations. Assuming that the present operation frequency of DRAM is assumed to be 160 MHz and that the status count in the status counter 1113 during one second is 80 millions, the bandwidth utilization rate of DRAM at the present operation frequency is calculated as (80/160)*100%, i.e., 50%.

Another example, the present operation frequency of DRAM is 120 MHz. DRAM employs 16-bit SDRAM as its memory. The bandwidth utilization rate of DRAM obtained by the statistic module 11 is 20%. The effective bandwidth of DRAM is 120*16*20% Mbps, i.e., 384 Mbps. The bandwidth utilization rate 20% can be considered as steady if nothing has changed in the application environment. If the bandwidth utilization rate of 60% is desired, the interruption control module 112 sends out the first interruption signal, the parameter configuration module 12 then sets the target operation frequency of DRAM to 384/16/60% MHz, i.e., 40 MHz. The frequency switch controller 13 adjusts the operation frequency of DRAM to 40 MHz. Thus, the effective bandwidth of DRAM remains at 40*16*60%=384 Mbps, while the operation frequency of DRAM decreases to 40 MHz, which results in a reduction of power consumption.

Yet for another example: the present operation frequency of DRAM is at 40 MHz. The DRAM employs 16-bit SDRAM as its memory. The threshold value of the bandwidth utilization rate is 60% at the present application environment. If the bandwidth utilization rate of DRAM obtained by the statistic module 11 is 80%, which exceeds the threshold value, the interruption control module 112 sends out the second interruption signal. Suppose that the bandwidth utilization rate 40% is more appropriate for the present application environment, the parameter configuration module 12 sets the target operation frequency of DRAM to (40*16*80%)/16/40% MHz, i.e., 80 MHz. The frequency switch controller 13 adjusts the operation frequency of DRAM to 80 MHz. Thus, the efficiency of DRAM is improved.

Figure 5:
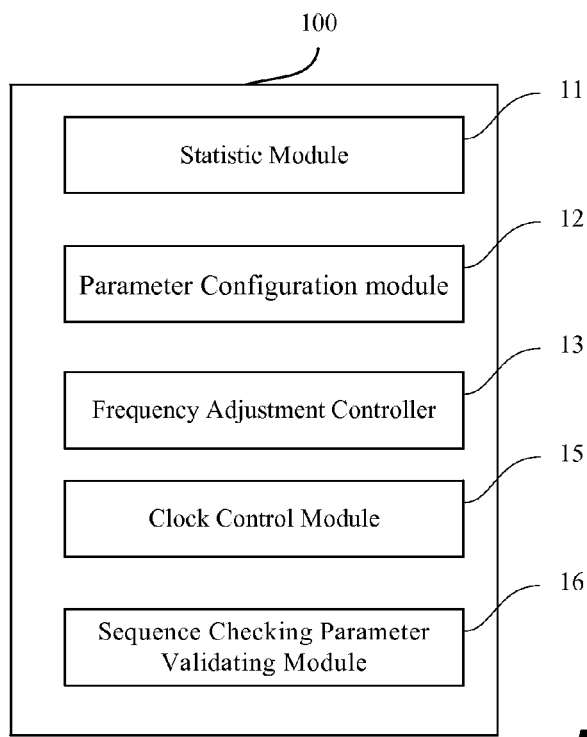
FIG. 5 is a schematic diagram showing another example of a DRAM operation frequency adjusting system.

Referring to FIG. 5, in order to prevent data from being lost during the adjusting of the operation frequency of DRAM, according to one embodiment, the DRAM operation frequency adjusting system 100 further comprises a clock control module 15. When the frequency switch controller 13 is in operation, the clock control module 15 refreshes DRAM according to an internal clock; when the operation of frequency switch controller 13 is complete, the DRAM is refreshed according to a system clock.

In a practical application, the refreshment of DRAM is divided into two classes: Auto Refresh (AR) and Self Refresh (SR). Accordingly, DRAM has two operation modes including an AR mode and an SR mode. In the AR mode, DRAM is refreshed under the system clock operation. In the SR mode, DRAM is refreshed under the internal clock in the DRAM.

When DRAM is in the SR mode, the system clock is no longer required to refresh the DRAM. Therefore, adjusting the operation frequency of DRAM from the present operation frequency to the target operation frequency is carried out in the SR mode. After DRAM exits from the SR mode, DRAM is operated at the target operation frequency.

Figure 6:
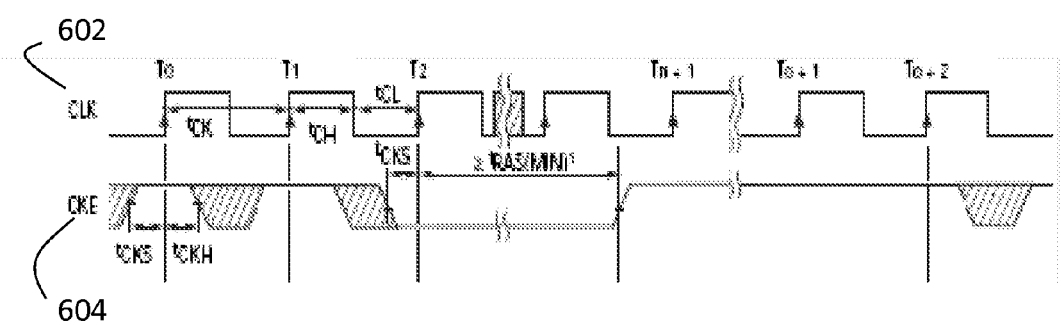
FIG. 6 is a time sequence chart of operation of DRAM.

Referring to FIG. 6 where a time sequence chart of operation of DRAM is shown. CLK is the provided system clock for the DRAM. The frequency of CLK 602 before the time T2 may be different from the frequency of CLK 602 after the time Tn+1. According to one embodiment, the frequency before the time T2 is the present operation frequency of DRAM. The adjustment of the operation frequency of DRAM is carried out between the T2 and Tn+1. The frequency of CLK after the time T2 is the target operation frequency hence.

In SR mode, because all the external signals are invalid except the clock Enable signal (CKE) 604, there is no need to provide external refreshes for the DRAM. Adjustment of the operation frequency in SR mode keeps a good balance between the efficiency and the power consumption of DRAM without resulting in the loss of data.

In order to ensure a valid system clock after the completion of adjustment of the operation frequency, the system clock is checked by a sequence checking parameter. Referring to FIG. 5, the DRAM operation frequency adjusting system 100 further comprises a sequence checking parameter validating module 16. The sequence checking parameter validating module 16 is configured for collecting a sequence checking parameter corresponding to the target operation frequency.

Generally, the sequence checking parameter is linearly related to the frequency of the system clock of DRAM. For example, suppose that the refresh interval of DRAM is 10 μs, at a frequency of 100 MHz, the sequence checking parameter is set at 1000; under a frequency of 10 MHz, the sequence checking parameter is set at 100. The clock control module 15 and the sequence checking parameter validating module 16 may be implemented internally or externally of the DRAM controller 91.

Figure 7:
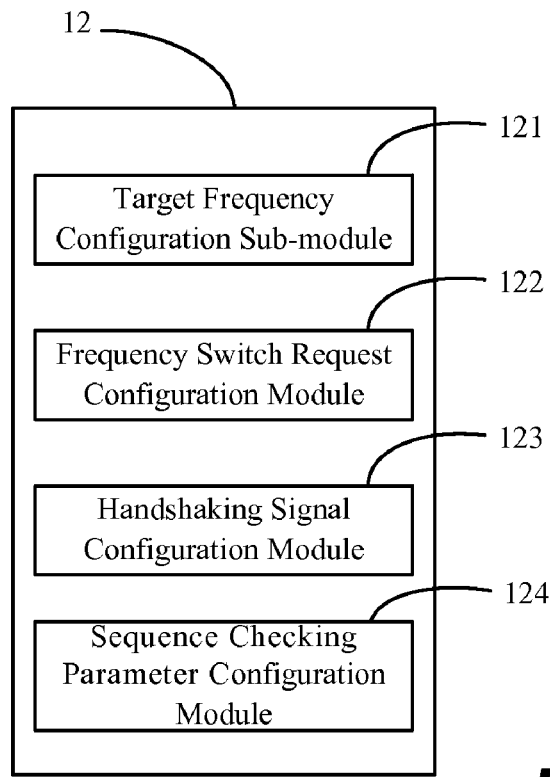
FIG. 7 is a schematic diagram showing another example of a parameter configuration module.

Referring to FIG. 7, the parameter configuration module 12 further comprises a frequency switch request configuration module 122 configured for setting a default frequency switch request signal value to denoting invalid; a handshaking signal configuration module 123 configured for generating a default handshaking signal value to invalid; and a sequence checking parameter configuration module 124 configured for generating sequence checking parameters corresponding to the operation frequencies of DRAM.

Figure 8:
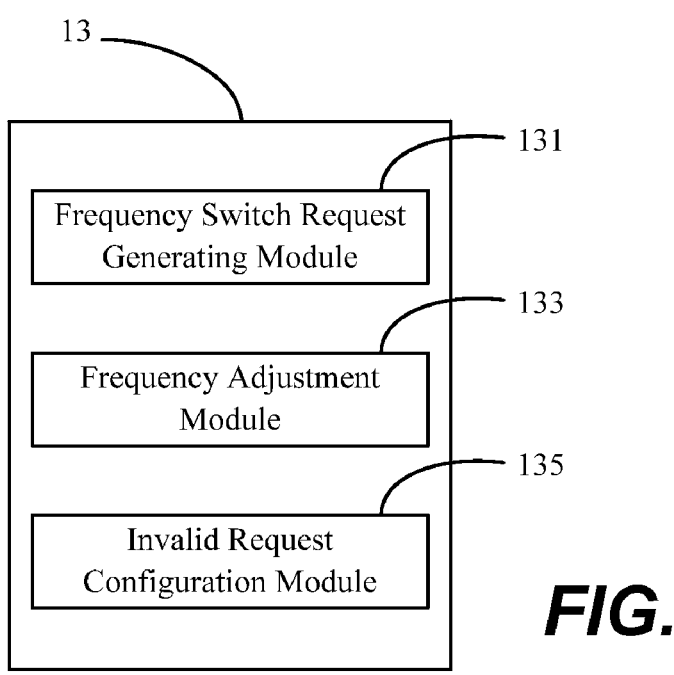
FIG. 8 is a schematic diagram showing an example of a frequency switch controller.

Referring to FIG. 8, the frequency switch controller 13 comprises a frequency switch request generating module 131, a frequency adjustment module 133, and an invalid request configuration module 135. The frequency switch request generating module 131 is configured for generating a frequency switch request signal and setting the frequency switch request signal to valid. The frequency adjustment module 133 is configured for switching the present operation frequency of DRAM to the target operation frequency according to a valid handshaking signal. The invalid request configuration module 135 is configured for enabling the frequency switch request signal to return to invalid after the frequency adjustment module 133 finishes the frequency adjustment.

Figure 9:
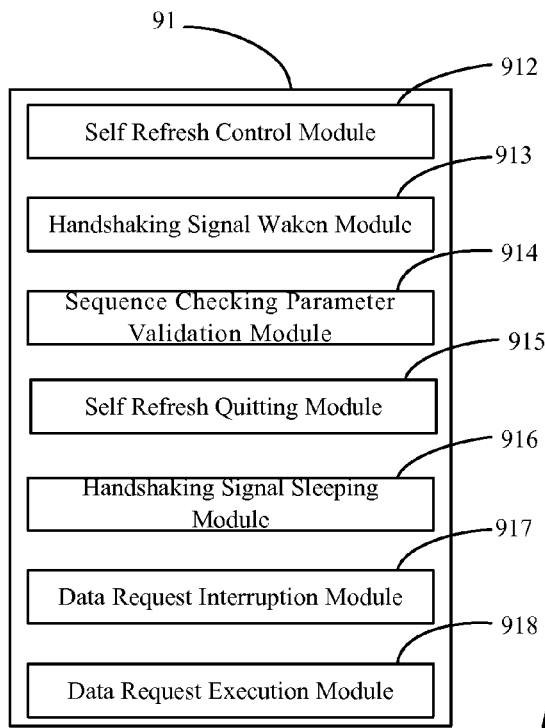
FIG. 9 is a schematic diagram showing an example of a DRAM controller.

Referring to FIG. 9, the DRAM controller 91 further comprises a self refresh control module 912, a handshaking signal waken module 913, a sequence checking parameter validation module 914, a self refresh quitting module 915, and a handshaking signal sleeping module 916.

The self refresh control module 912 is configured for sending out a first controlling command, which requests DRAM to refresh under the internal clock, according to a valid frequency switch request signal. The handshaking signal waken module 913 is configured for setting the handshaking signal to valid after the first controlling command is sent. The sequence checking parameter validation module 914 is configured for collecting a sequence checking parameter corresponding to the target operation frequency when the frequency switch request signal return is invalid. The self refresh quitting module 915 is configured for determining the system clock according to the sequence checking parameter, and sending out a second controlling command, which requests DRAM to refresh under the system clock. The handshaking signal sleeping module 916 is configured for resetting the handshaking signal to invalid after the second controlling command is sent.

In order to avoid losing data during the frequency adjustment of DRAM, the DRAM controller also comprises: a data request interruption module 917 configured for executing existing data requests and stopping answering new data requests, after receiving a valid frequency switch request signal before the first controlling command is sent; and a data request execution module 918 configured for accepting new data requests after the handshaking signal returns invalid.

In practice, the DRAM controller 91 accepts external data requests, and executes all the data requests accordingly, but stop answering new data requests, i.e., stop function modules of chips from accessing DRAM, right before the frequency adjustment starts. Therefore, the loss of data is avoided during the frequency adjustment.

Because all external signals are invalid except the Clock Enable Signal (CKE) when DRAM is in the self refresh mode, external refresh instruction is not necessary, which improves the DRAM power consumption. To facilitate the understanding of how the DRAM operation frequency adjusting system 100 works, an exemplary process based on the above described embodiments is presented herein.

Suppose that the target frequency configuration sub-module 121 has already generated a target operation frequency, the frequency switch request configuration module 122 sets a default value of the frequency switch request signal (i.e., clock switch request, hereinafter referred as "csr"). The default value of csr is set as invalid. That is, the default value of csr is set to a binary code "0". The handshaking signal configuration module 123 sets the default value of the handshaking signal (hereinafter referred as "sl"). The default value of sl is set as invalid. That is, the default value of sl is set to a binary code "0". The sequence checking parameter configuration module 124 configures sequence checking parameters for the present operation frequency and for the target operation frequency of DRAM.

In this situation, the process for switching the present operation frequency of DRAM to the target operation frequency includes the following functions: at S101, the frequency switch request generating module generates a frequency switch request signal (csr), and the value of the frequency switch request signal (csr) is set to valid, i.e., a binary code "1".

At S102, the self refresh control module 912 sends out the first controlling command, which requests DRAM to refresh under the internal clock, after detecting that the value of csr is "1". At S103, the handshaking signal waken module 913 sets the value of the handshaking signal to valid, i.e., a binary code "1". The frequency adjustment module 133 switches the present operation frequency of DRAM to the target operation frequency at S104, after detecting that the value of sl is "1". The invalid request configuration module 135 resets the value of the frequency switch request signal (csr) to "0" at S105, after the frequency switch is completed.

At S106, the sequence checking parameter validation module 914 collects a sequence checking parameter corresponding to the target operation frequency after detecting that the value of the frequency switch request signal (csr) is "1". The self refresh quitting module 915 determines the system clock at S107 according to the sequence checking parameter and sends out the second controlling command, which requests DRAM to refresh under the system clock. The handshaking signal sleeping module 916 resets the handshaking signal (sl) from "1" to "0" at S108.

It should be noted that the present invention is not limited to the illustrated method of communication between the DRAM controller 91 and the frequency switch controller 13 by employing the frequency switch request signal and the handshaking signal. Other communication means may also be applied.

The invention can be implemented to multi-media system-on-chips. When the processor or the hardware accelerator accesses a DRAM, the DRAM operation frequency adjusting system 100 adjusts the operation frequency of DRAM according to characteristics of media tasks.

Figure 10:
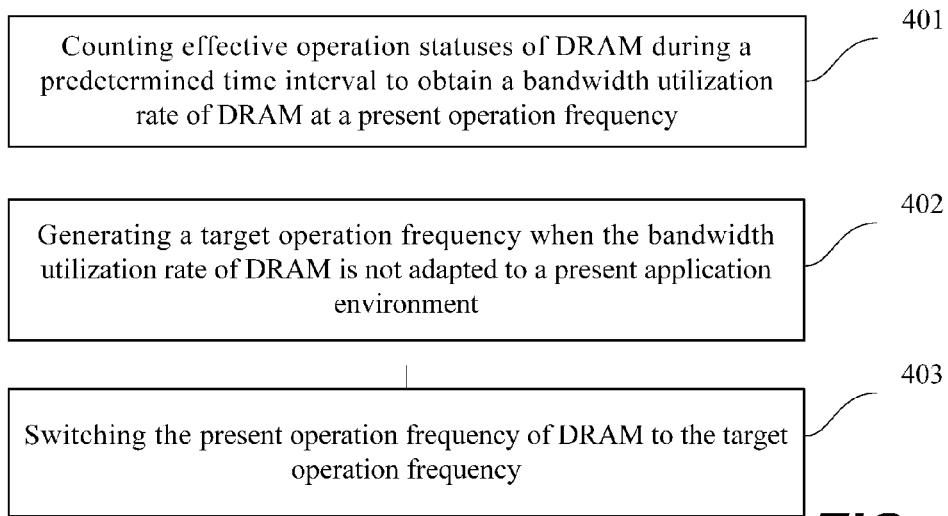
FIG. 10 is a flowchart showing an example of a DRAM operation frequency adjusting method.

Referring to FIG. 10, a flowchart or process of a DRAM operation frequency adjusting method is shown. DRAM operation frequency adjusting method comprises following operations. At 401, the effective operations of DRAM during a predetermined time interval are counted to obtain a bandwidth utilization rate of DRAM at a present operation frequency. A target operation frequency is generated at 402 when the bandwidth utilization rate of DRAM is not suitable for the present application environment. The present operation frequency of DRAM is switched to the target operation frequency at 403.

The function at 401 includes the following operations: (1) counting non-idle operations of a finite state machine 910 in a DRAM controller of DRAM to obtain the effective operation statuses of DRAM; and (2) determining the bandwidth utilization rate of DRAM according to the effective operations of DRAM at the end of the predetermined time interval; (3) generating a first interruption signal indicating that the operation frequency of DRAM should decrease when the bandwidth utilization rate of DRAM at present is low, or generating a second interruption signal denoting that the operation frequency of DRAM should increase when the bandwidth utilization rate of DRAM at present exceeds a predetermined interruption threshold value in the predetermined time interval.

The function 402 includes the following operations: (1) generating a target operation frequency lower than the present operation frequency of DRAM according to the first interruption signal, or, (2) generating a target operation frequency higher than the present operation frequency of DRAM according to the second interruption.

According to one embodiment, the present invention further comprises: requesting DRAM to refresh under an internal clock during the frequency switching, and requesting DRAM to refresh under a system clock when frequency switching is completed. The system clock is determined by a sequence checking parameter. The DRAM operation frequency adjusting method further comprises obtaining a corresponding sequence checking parameter according to the target operation frequency.

According to one embodiment of the present invention, the method further comprises: presetting a default frequency switch request signal value to invalid, a default handshaking signal value to invalid, and sequence checking parameters corresponding to the operation frequencies of DRAM.

The function of switching the operation frequency of DRAM may further comprises following operations: (1) generating a frequency switch request signal and setting the frequency switch request signal to valid; (2), sending out a first controlling command, which requests DRAM to refresh under the internal clock, according a valid frequency switch request signal; (3) setting the handshaking signal to valid after sending out the first controlling command; (4) switching the present operation frequency of DRAM to the target operation frequency according to a valid handshaking signal; (5) resetting the frequency switch request signal to invalid after finishing the frequency switching; (6) collecting a sequence checking parameter corresponding to the target operation frequency when the frequency switch request signal return is invalid; (7) determining the system clock according to the sequence checking parameter and sending out the second controlling command, which requests DRAM to refresh under the system clock; and (8) resetting the handshaking signal to invalid.

According to one embodiment, in order to avoid losing data during the frequency switch of DRAM, the method further comprises: executing accepted data requests and stopping answering new data requests after a valid frequency switch request signal is received before the first controlling command is sent; and accepting new data requests after the handshaking signal return is invalid.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

What is claimed is:

1. An operation frequency adjusting system comprising:
a statistic module counting effective operations of a Dynamic Random-Access Memory (DRAM);
a parameter configuration module generating a target operation frequency according to a count of the effective operations of the DRAM; and
a frequency switch controller switching from a present operation frequency of the DRAM to the target operation frequency.

2. The system as claimed in claim 1, wherein the statistic module obtains the count of the effective operations of the DRAM by counting non-idle operations of a finite state machine of the DRAM.

3. The system as claimed in claim 1, wherein the statistic module comprises an effective operation status statistic module and an interruption control module, the effective operation status statistic module counting the non-idle operations of the finite state machine of the DRAM during a predetermined time interval to obtain a bandwidth utilization rate of the DRAM at the current operation frequency, the interruption control module generating an interruption signal for adjusting the operation frequency of the DRAM.

4. The system as claimed in claim 3, wherein the effective operation status statistic module comprises:
a time interval register setting the predetermined time interval;
a time counter measuring time during the predetermined time interval and a resetting time count at an end of the predetermined time interval;
a status counter counting the non-idle operations of the finite state machine during the predetermined time interval, copying a status count thereof to a status accumulation register at an end of the predetermined time interval, and then clearing the status count thereof; and
a status accumulation register saving the status count from the status counter at the end of the predetermined time interval.

5. The system as claimed in claim 3, wherein the interruption signal includes a first interruption signal and a second interruption signal, the interruption control module generating the first interruption signal indicating that decreasing the operation frequency of the DRAM is desired when a present bandwidth utilization rate of the DRAM is lower than a desired bandwidth utilization rate; and generating the second interruption signal indicating that increasing the operation frequency of the DRAM is desired when the status counter of the non-idle operations of the finite state machine in the predetermined time interval exceeds a predetermined interruption threshold value.

6. The system as claimed in claim 4, wherein the interruption control module comprises:
an interruption threshold value register setting a threshold value of the bandwidth utilization rate; and
an interruption controlling logic module sending out an interruption signal according to the status count of the status counter in the predetermined time interval and the threshold value, or according to the status count saved in the status accumulation register.

7. The system as claimed in claim 6, wherein the interruption controlling logic module comprises:
a first interruption control module generating a first interruption signal indicating that deceasing the operation frequency of the DRAM at the present operation frequency is desired if the bandwidth utilization rate of the DRAM at the present operation frequency is low; and
a second interruption control module generating a second interruption signal indicating that increase of the operation frequency of the DRAM is desired if the bandwidth utilization rate of the DRAM at the present frequency is high.

8. The system as claimed in claim 7, wherein the parameter configuration module comprises a target frequency configuration sub-module, the target frequency configuration sub-module comprising:
- a first configuration unit generating a target operation frequency lower than the present operation frequency of the DRAM according to the first interruption signal; and
- a second configuration unit generating a target operation frequency higher than the present operation frequency of the DRAM according to the second interruption signal.

9. The system as claimed in claim 1, further comprising a clock control module enabling the DRAM to refresh according to an internal clock while the frequency switch controller is in operation, and enabling the DRAM to refresh according to a system clock after the frequency switch controller operation is completed.

10. The system as claimed in claim 9, wherein the system clock frequency is determined by a sequence checking parameter, wherein the system further comprising a sequence checking parameter validating module collecting a sequence checking parameter corresponding to the target operation frequency.

11. The system as claimed in claim 9, wherein the clock control module and the sequence checking parameter validating module are implemented in a DRAM controller of the DRAM.

12. The system as claimed in claim 1, wherein the parameter configuration module comprises:
- a frequency switch request configuration module configured for setting a default frequency switch request signal value to invalid;
- a handshaking signal configuration module configured for generating a default handshaking signal value to invalid; and
- a sequence checking parameter configuration module configured for generating sequence checking parameters corresponding to operation frequencies of the DRAM; and wherein
  the frequency adjustment controller comprises:
- a frequency switch request generating module configured for generating a frequency switch request signal and setting the frequency switch request signal to valid;
- a frequency adjustment module configured for switching the present operation frequency of DRAM to the target operation frequency according to a valid handshaking signal; and
- an invalid request configuration module configured for enabling the frequency switch request signal to return to invalid after the frequency adjustment module finishes the frequency switch.

13. The system as claimed in claim 1, further comprising a DRAM controller connected to the frequency switch controller, wherein the DRAM controller comprises:
- a self refresh control module configured for sending a first controlling command, which requests the DRAM to refresh under the internal clock, according to the valid frequency switch request signal;
- a handshaking signal waken module configured for setting the handshaking signal to valid after the first controlling command is sent;
- a sequence checking parameter validation module configured for collecting a sequence checking parameter corresponding to the target operation frequency when the frequency switch request signal return is invalid;
- a self refresh quitting module configured for determining the system clock according to the sequence checking parameter and sending a second controlling command, which requests the DRAM to refresh under the system clock; and
- a handshaking signal sleeping module configured for resetting the handshaking signal to invalid after the second controlling command is sent.

14. The system as claimed in claim 13, wherein the DRAM controller further comprises:
- a data request interruption module configured for executing existing data requests and stopping answering new data requests after receiving a valid frequency switch request signal but before the first controlling command is sent; and
- a data request execution module configured for accepting new data requests after the handshaking signal return is invalid.

15. An operation frequency adjusting method comprising:
- counting effective operations of a Dynamic Random-Access Memory (DRAM) during a predetermined time interval to obtain a bandwidth utilization rate of the DRAM at a present operation frequency;
- generating a target operation frequency when the bandwidth utilization rate of the DRAM is not suitable for a present application environment; and
- switching the present operation frequency of the DRAM to the target operation frequency.

16. The method as claimed in claim 15, wherein the counting effective operations of the DRAM comprises:
- counting non-idle operations of a finite state machine in a DRAM controller for the DRAM during the predetermined time interval to obtain the effective operation statuses of the DRAM; and
- determining the bandwidth utilization rate of the DRAM according to the effective operations of the DRAM at an end of the predetermined time interval, generating a first interruption signal indicating that a decrease of the operation frequency of the DRAM is desired when the bandwidth utilization rate of the DRAM is low; and generating a second interruption signal indicating that an increase of the operation frequency of the DRAM is desired when the bandwidth utilization rate of the DRAM exceeds a predetermined interruption threshold value in the predetermined time interval.

17. The method as claimed in claim 16, wherein the generating a target operation frequency comprises:
- generating a target operation frequency lower than the present operation frequency of the DRAM according to the first interruption signal when the first interruption signal is generated; or, generating a target operation frequency higher than the present operation frequency of the DRAM according to the second interruption signal when the second interruption signal is generated.

18. The method as claimed in claim 15, further comprising:
- requesting the DRAM to refresh under an internal clock during the frequency switching; and
- requesting the DRAM to refresh under a system clock.

19. The method as claimed in claim 18, wherein the system clock is determined by a sequence checking parameter, the method further comprising:
- obtaining a corresponding sequence checking parameter according to the target operation frequency.

20. The method as claimed in claim 15, further comprising:
- pre-setting a default frequency switch request signal value to invalid, a default handshaking signal value to invalid, and sequence checking parameters corresponding to operation frequencies of the DRAM;
- wherein the switching the operation frequency comprises:

generating a frequency switch request signal and setting the frequency switch request signal to valid;

sending a first controlling command, which requests the DRAM to refresh under the internal clock, according a valid frequency switch request signal;

setting the handshaking signal to valid after sending the first controlling command;

switching the present operation frequency of the DRAM to the target operation frequency according to a valid handshaking signal;

resetting the frequency switch request signal to invalid after finishing the frequency switch;

collecting a sequence checking parameter corresponding to the target operation frequency when the frequency switch request signal return is invalid;

determining the system clock according to the sequence checking parameter and sending out a second controlling command, which requests DRAM to refresh under the system clock; and resetting the handshaking signal to invalid.

21. The method as claimed in claim 20, further comprising:

executing accepted data requests and stopping answering new data requests after receiving a valid frequency switch request signal but before sending out the first controlling command; and accepting new data requests after the handshaking signal return is invalid.

22. The method as claimed in claim 18, wherein the counting effective operations of the DRAM comprises:

counting non-idle operations of a finite state machine in a DRAM controller of the DRAM during the predetermined time interval to obtain the effective operation statuses of the DRAM; and generating a first interruption signal indicating that decrease of the operation frequency of the DRAM is desired at the end of the predetermined time interval;

or generating a second interruption signal indicating that increase of the operation frequency of the DRAM is desired when the count of the non-idle operations of the finite state machine exceeds a predetermined interruption threshold value in the predetermined time interval; and wherein the generating a target operation frequency comprises:

generating a target operation frequency lower than the present operation frequency of the DRAM according to the first interruption signal when the first interruption signal is generated; or generating a target operation frequency higher than the present operation frequency of the DRAM according to the second interruption signal when the second interruption signal is generated.

* * * * *